(12) United States Patent
Yang et al.

(10) Patent No.: US 10,895,275 B2
(45) Date of Patent: Jan. 19, 2021

(54) TOOL-LESS ASSEMBLING OF ELECTRONIC BOARD ON CHASSIS

(71) Applicant: HEWLETT PACKARD ENTERPRISE DEVELOPMENT LP, Houston, TX (US)

(72) Inventors: Shou-Jen Yang, Taipei (CN); Minh H Nguyen, Houston, TX (US); Jui Lin Chen, Taipei (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 337 days.

(21) Appl. No.: 15/775,518

(22) PCT Filed: May 11, 2016

(86) PCT No.: PCT/US2016/031745
§ 371 (c)(1),
(2) Date: May 11, 2018

(87) PCT Pub. No.: WO2017/196309
PCT Pub. Date: Nov. 16, 2017

(65) Prior Publication Data
US 2018/0328392 A1 Nov. 15, 2018

(51) Int. Cl.
*F16B 43/02* (2006.01)
*F16B 5/06* (2006.01)
*F16B 5/02* (2006.01)

(52) U.S. Cl.
CPC .............. *F16B 5/065* (2013.01); *F16B 5/02* (2013.01); *F16B 5/0657* (2013.01)

(58) Field of Classification Search
CPC ...................................................... F16B 5/065
(Continued)

(56) References Cited

U.S. PATENT DOCUMENTS 2,151,284 A * 3/1939 Tinnerman ............ E05C 19/063
292/17
2,246,457 A * 6/1941 Schultz ................... F16B 35/04
403/217

(Continued)

FOREIGN PATENT DOCUMENTS

CN 201126554 Y 10/2008
WO WO-2003069168 A2 8/2003

OTHER PUBLICATIONS

International Search Report and Written Opinion, International Application No. PCT/US2016/031745, dated Feb. 9, 2017, pp. 1-12, KIPO.

*Primary Examiner* — Gary W Estremsky
(74) *Attorney, Agent, or Firm* — Nolte Lackenbach Siegel

(57) ABSTRACT

The present subject matter relates to screws for tool-less assembling of an electronic board on a chassis. In an example implementation, the screw comprises a threaded pin to secure the screw on the electronic board using a nut. The screw also comprises a screw head that fits into a hook on the chassis when the electronic board is assembled on the chassis. The screw further comprises a flange integral to the screw and positioned between the threaded pin and the screw head. The flange is extended radially to support the electronic board and is positioned at a distance from the screw head based on a gap to be maintained between the electronic board and the chassis.

10 Claims, 4 Drawing Sheets

(58) Field of Classification Search
USPC .......................................... 411/546, 400, 401
See application file for complete search history.

(56) References Cited

U.S. PATENT DOCUMENTS

| | | | | |
|---|---|---|---|---|
| 2,600,974 | A * | 6/1952 | Crawford | B64D 37/04 |
| | | | | 244/135 B |
| 3,648,559 | A * | 3/1972 | Hudnall | F16B 2/241 |
| | | | | 411/529 |
| 4,405,285 | A * | 9/1983 | Surdi | F01D 5/326 |
| | | | | 411/107 |
| 6,347,042 | B1 * | 2/2002 | White | H05K 7/142 |
| | | | | 174/138 D |
| 6,669,313 | B2 * | 12/2003 | Liao | F16B 5/065 |
| | | | | 312/7.2 |
| 6,741,477 | B2 * | 5/2004 | Sivertsen | H05K 7/142 |
| | | | | 174/535 |
| 7,184,277 | B2 * | 2/2007 | Beirne | A63F 13/08 |
| | | | | 361/807 |
| 7,198,465 | B1 * | 4/2007 | Ichiryu | F01D 25/243 |
| | | | | 415/214.1 |
| 7,656,657 | B2 | 2/2010 | Grady et al. | |
| 8,649,180 | B2 | 2/2014 | Grady et al. | |
| 9,121,422 | B2 | 9/2015 | Sauer et al. | |
| 2006/0264121 | A1 | 11/2006 | Camacho | |
| 2010/0254078 | A1 | 10/2010 | Zheng et al. | |
| 2012/0318477 | A1 * | 12/2012 | Yang | H01L 23/4006 |
| | | | | 165/67 |
| 2014/0140024 | A1 | 5/2014 | Huang et al. | |
| 2015/0101458 | A1 * | 4/2015 | Saje | F16B 35/06 |
| | | | | 81/121.1 |

* cited by examiner

TOOL-LESS ASSEMBLING OF ELECTRONIC BOARD ON CHASSIS

BACKGROUND

Devices, such as computers and servers, have electronic boards assembled on a chassis. The electronic boards, for example a motherboard, a memory board, an input/output board, and such, may be assembled or mounted on the chassis through electrical contacts. The chassis may be an electrically conductive chassis which provides a chassis-ground to the electronic boards. A gap is maintained between the electronic boards and the chassis to avoid any direct contact of components and connections of the electronic boards with the chassis and also to allow heat to dissipate between the electronic boards and the chassis.

BRIEF DESCRIPTION OF DRAWINGS

The following detailed description references the drawings, wherein.

DETAILED DESCRIPTION

Figure 1:
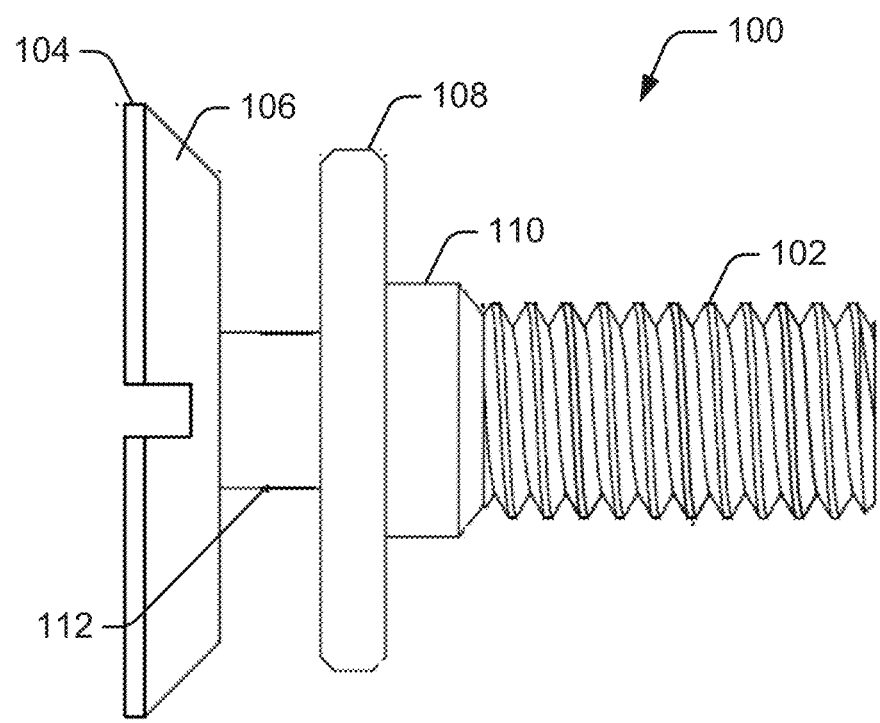
FIG. 1 illustrates a screw for tool-less assembling of an electronic board on a chassis, according to an example implementation of the present subject matter.

An electronic board is generally assembled on a chassis of a device through screws, nuts, and standoffs. The chassis may be an electrically conductive chassis, and the standoffs may be metal standoffs that form an electrical contact between the electronic board and the chassis to provide a chassis-ground to the electronic board. The standoffs are of specific height that allows the electronic board to be at a gap from the chassis for effective heat dissipation and avoiding any direct contact of the electronic board and the chassis.

Assembling an electronic board on a chassis through screws, nuts, and standoffs involves alignment of standoffs with holes on the electronic board and on the chassis. The alignment of the standoffs and the holes makes the assembly process difficult, laborious, and time consuming. In case of assembling an electronic board on a chassis of an enclosure of a server, any of the screws, the nuts, and the standoffs may fall off within the enclosure during the alignment and assembly process. The screws, the nuts, and the standoffs may fall off to inaccessible locations or over other components, which may adversely affect the performance of the enclosure.

Further, assembling an electronic board on a chassis through screws, nuts, and standoffs generally involves use of tools by an assembly personnel. The use of tools may be complicated and may slow down the assembly process. Also, the use of tools may be difficult if the electronic board is assembled on the chassis where there is a lack of space, for example in an enclosure of a server.

The present subject matter describes screws and nuts that enable tool-less assembling of electronic boards on a chassis. The screws and the nuts of the present subject matter, together referred as a coupling unit, facilitate in reducing the amount of effort and time involved in assembling of electronic boards on a chassis. The screws and the nuts of the present subject matter also enable assembly of electronic boards on a chassis without use of any tools. The electronic boards can be easily assembled even when there is lack of space around the chassis.

In an example implementation, the screw of the present subject matter includes a threaded pin at one end of the screw and a screw head at another end of the screw. The screw can be secured on the electronic board by fastening a nut to the threaded pin. The screw head of the screw is substantially flat and extended radially such that it can fit into a hook on the chassis when the electronic board is assembled on the chassis.

The screw of the present subject matter also includes a flange integral to the screw and positioned between the threaded pin and the screw head. The flange is extended radially from the screw such that it can support the electronic board when the electronic board is assembled on the chassis. Further, the flange is positioned at a distance from the screw head. The distance from the screw head depends on a gap to be maintained between the electronic board and the chassis after assembly of the electronic board on the chassis.

In an example implementation, the nut used for securing the screw on the electronic board may be a hex-nut. The hex-nut includes internal threads that complement the threads on the threaded pin of the screw, such that the hex-nut can be coupled to the threaded pin for securing the screw on the electronic board. Further, the hex-nut of the present subject matter includes a flange integral at one end of the hex-nut. The flange of the hex-nut is ribbed. The ribbed flange provides a better grip of the hex-nut for the assembly person to tightly fasten the hex-nut on the threaded pin with substantial ease.

For assembling the electronic board on the chassis, the screws of the present subject matter may be secured, for example, at the corners of the electronic board using the hex-nuts. For securing the screw, the threaded pin of the screw may be passed through a hole in the electronic board, from the bottom side of the electronic board, such that the flange of the screw abuts the bottom surface of the electronic board. The hex-nut may then be fastened on the threaded pin protruding out from the hole in the electronic board. After securing the screws, for example, at the corners of the electronic board, the electronic board may be slid onto the chassis such that the screw head of each of the screws fits into a respective hook on the chassis. It may be noted that the chassis may have multiple receptacle hooks at locations depending on the locations of the holes on the electronic board through which the screws are secured. After sliding the electronic board and fitting the screw heads into the hooks on the chassis, the electronic board may be locked on the chassis using a thumbscrew or a plunger.

The screws and the nuts of the present subject matter allows for simple and easy assembling of the electronic boards on the chassis without any tools. The flange of the screws of the present subject matter enables maintaining a gap between the electronic boards and the chassis. As a result, the use of standoffs and complicated alignment procedures associated with the standoffs are eliminated. Further, since the assembly procedure involves securing the screws and then sliding the electronic board on the chassis, the chances of loose screws or nuts falling off during assembling of the electronic board can be substantially eliminated.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a screw 100 for tool-less assembling of an electronic board on a chassis, according to an example implementation of the present subject matter. As shown, the screw 100 has a threaded pin 102 at one end of the screw 100. The threaded pin 102 has a cylindrical shape and has screw threads on its surface for fastening purposes. The screw threads of the threaded pin 102 may be equally spaced.

The length of the threaded pin 102 may depend on the thickness of the electronic board and on the height of the nut for securing the screw 100 on the electronic board. The diameter of the threaded pin 102 may depend on an inner diameter of a hole in the electronic board to allow the threaded pin 102 to pass through. In an example implementation, the threaded pin 102 has a length of about 6.0 mm (with a tolerance of about ±0.15 mm). With the screw threads, the threaded pin 102 may have an outer diameter of about 3.484 mm (with a tolerance of about ±0.1 mm) and an inner diameter of about 3.333 mm (with a tolerance of about ±0.1 mm).

The screw 100, as shown, has a screw head 104 on the other end of the screw 100. The screw head 104 is substantially flat at the top and is extended radially from the screw 100. The curved surface 106 of the screw head 104 has an inclined profile. In other words, the diameter of the screw head 104 varies from one end of the screw head 104 to the other end of the screw head 104. The inclined profile of the screw head 104 allows the screw head 104 to securely sit at the hole in the electronic board when the screw 100 is secured. The maximum diameter and the height of the screw head 104 may depend on the dimensions of the hook on the chassis, such that the screw head 104 can fit into the hook when the electronic board is assembled on the chassis. In an example implementation, the screw head 104 has a maximum diameter of about 9.4 mm (with a tolerance of about ±0.15 mm) and a height of about 1.45 mm (with a tolerance of about ±0.1 mm).

Further, the screw 100 has a flange 108, as shown. The flange 108 is integral to the screw 100 and extends radially from the screw 100. The flange 108 is positioned between the threaded pin 102 and the screw head 104. As shown, the flange 108 is separated from the threaded pin 102 by a first cylindrical portion 110 of the screw 100 and is separated from the screw head 104 by a second cylindrical portion 112 of the screw 100.

The flange 108 of the screw 100 is at a distance from the screw head 104. The distance is based on a gap to be maintained between the electronic board and the chassis after assembling the electronic board on the chassis. The distance is equal to the length of the second cylindrical portion 112. The distance of the flange 108 from the screw head 104 can be varied by varying the length of the second cylindrical portion. In an example implementation, the distance of the flange 108 from the screw head 104 is about 1.55 mm (with a tolerance of about ±0.1 mm).

The flange 108 of the screw 100 extends radially to support the electronic board when the electronic board is assembled on the chassis. The diameter and the height/thickness of the flange 108 may depend on the strength of the flange 108 that is sufficient to support the electronic board. In an example implementation, the flange 108 has a diameter of about 8.0 mm (with a tolerance of about ±0.15 mm). The flange 108 may have a height/thickness of about 1.0 mm (with a tolerance of about ±0.1 mm).

The structural profile and dimensions of the screw 100 are such that, when the screw 100 is passed through a hole in the electronic board, the hole overlaps the first cylindrical portion 110 of the screw 100. The diameter of the first cylindrical portion 110 may be substantially equal to an inner diameter of a hole in the electronic board through which the screw 100 is passed. This facilitates in snug fitting of the first cylindrical portion 110 within the hole, which provides stability to the screw 100 secured on the electronic board. The external diameter of the threaded pin 102 is less than the diameter of the first cylindrical portion 110. This helps in passing of the threaded pin 102 through the hole in the electronic board with substantial ease. Further, the length of the first cylindrical portion 110 may depend on the thickness of the electronic board. In an example implementation, the first cylindrical portion 110 has a diameter of about 3.9 mm (with a tolerance of about ±0.1 mm) and a length of about 1.5 mm (with a tolerance of about ±0.1 mm).

Further, the diameter of the second cylindrical portion 112 may depend on the depth of hooks on the chassis, such that head of a hook on the chassis can sufficiently overlap the screw head 104 when the electronic board is assembled on the chassis. In an example implementation, the second cylindrical portion 112 has a diameter of about 2.4 mm (with a tolerance of about ±0.1 mm) and a length of about 1.55 mm (with a tolerance of about ±0.1 mm).

Figure 2A:
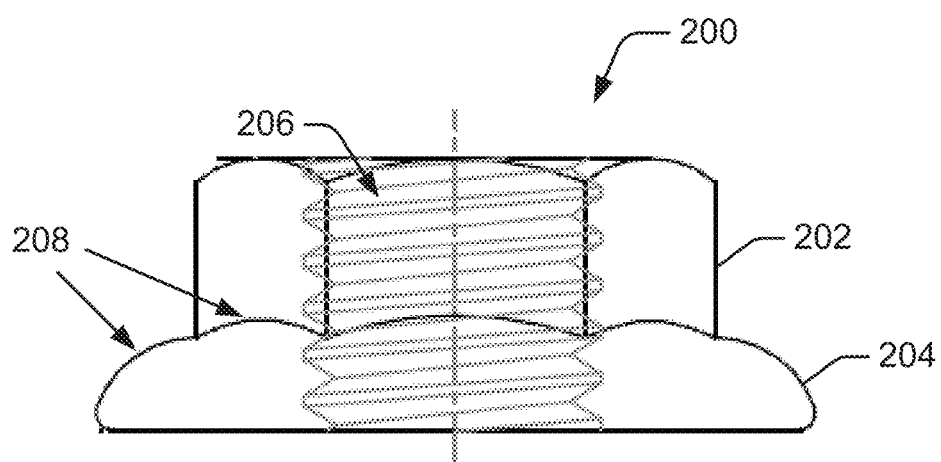
FIG. 2(a) illustrates a sectional view of a hex-nut, according to an example implementation of the present subject matter.
Figure 2B:
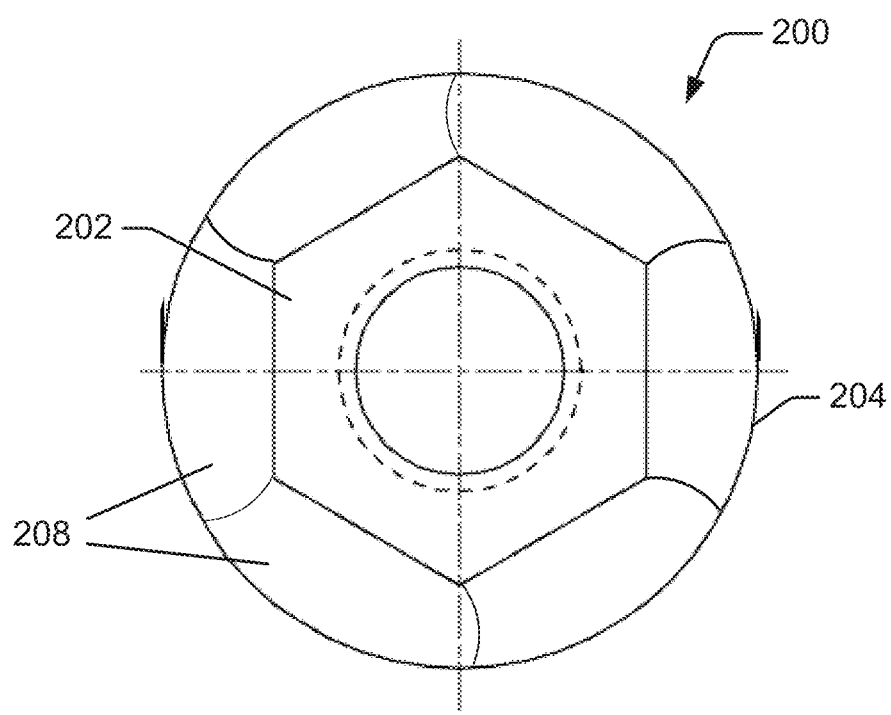
FIG. 2(b) illustrates a top view of the hex-nut, according to an example implementation of the present subject matter.

FIG. 2(a) illustrates a sectional view of a hex-nut 200, according to an example implementation of the present subject matter. FIG. 2(b) illustrates a top view of the hex-nut 200, according to an example implementation of the present subject matter. The hex-nut 200, as shown, has an annular body 202 with a hexagonal profile at its outer surface. The inner diameter of the annular body 202 depends on the diameter of the threaded pin 102 of the screw 100. The inner surface of the annular body 202 has screw threads 206. The screw threads 206 on the inner surface of the annular body 202 compliment the screw threads on the threaded pin 102 of the screw 100. In an example implementation, the annular body 202 of the hex-nut 200 has a height of about 3.8 mm (with a tolerance of about ±0.2 mm).

The hex-nut 200, as shown, has a flange 204 at one end of the annular body 202. The flange 204 is ribbed, i.e., has indentations 208 on its outer surface. The ribbed surface of the flange 204 helps in gripping of the hex-nut 200 while fastening it on the screw 100. The diameter and the height/thickness of the flange 204 may depend on the strength of the flange 204 and the amount of grip, that are sufficient to fasten the hex-nut 200 on the screw 100. In an example implementation, the flange 204 has a diameter of about 7.9 mm (with a tolerance of about ±0.3 mm).

The screw 100 and the hex-nut 200 may together form a coupling unit for tool-less assembling of the electronic board on the chassis.

In an example implementation, the screw 100 and the hex-nut 200 may be made of steel, stainless steel, or any other suitable material.

It may be noted that the description above mentions exemplary values of various dimensions of the screw 100 and the hex-nut 200. Other values are also possible depending on the electronic board and the chassis on which the electronic board is to be assembled.

Figure 3:
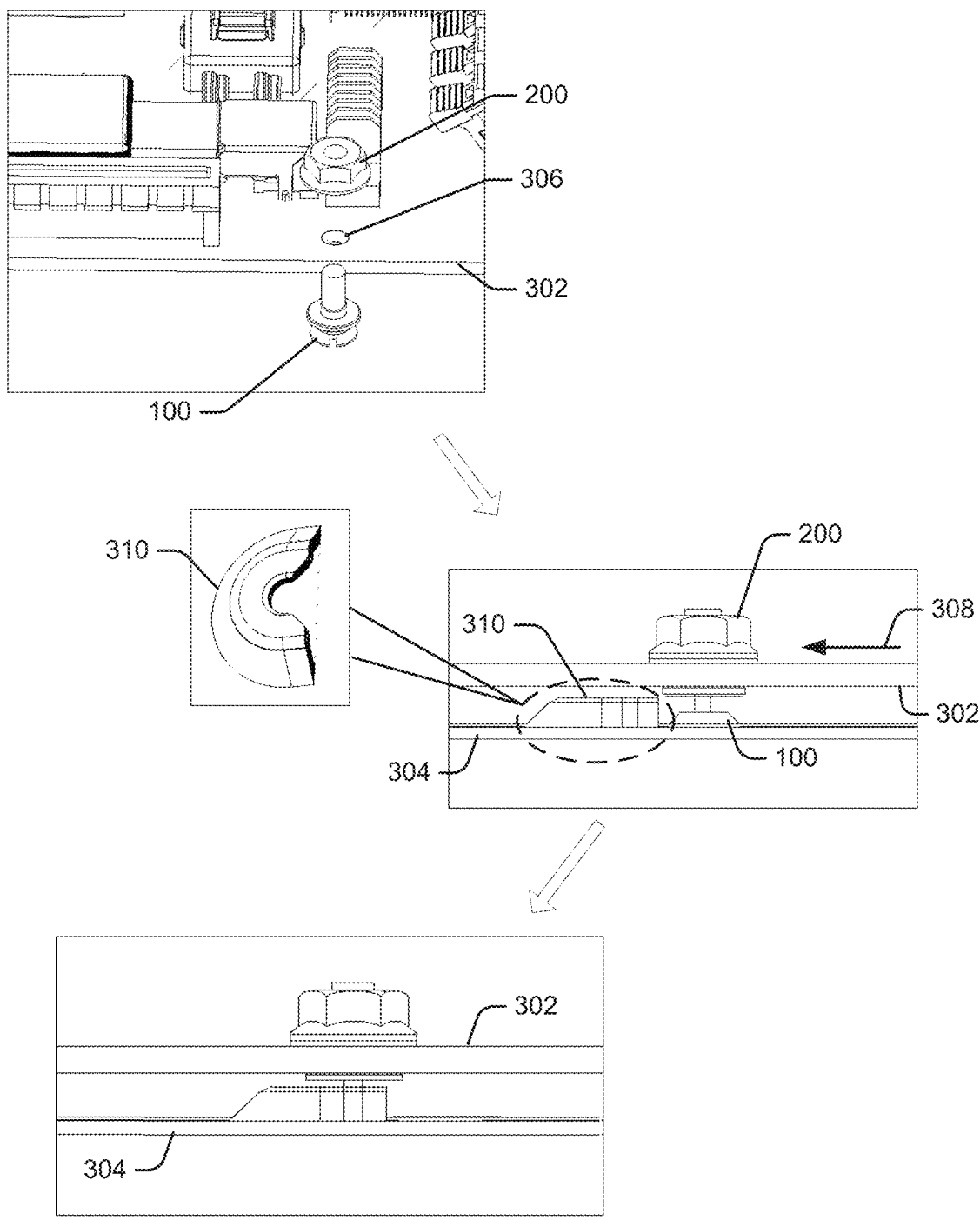
FIG. 3 illustrates different stages of tool-less assembling of an electronic board on a chassis using the screw and the hex-nut, according to an example implementation of the present subject matter.

FIG. 3 illustrates different stages of tool-less assembling of an electronic board 302 on a chassis 304 using the screw 100 and the hex-nut 200, according to an example implementation of the present subject matter. Although multiple screws may be secured at multiple holes, for example, at the corners of the electronic board 302 for assembling the electronic board 302 on the chassis 304, the description herein is described with reference to securing one screw 100 through the hex-nut 200 at one of the holes of the electronic board 302. It may be noted that the holes at which the screws are secured are the existing holes of the electronic board 302. It may also be noted that the chassis 304 may have receptacle hooks at locations depending on the locations of the holes on the electronic board through which the screws are secured.

At first, the screw 100 is secured at a hole 306 in the electronic board 302 by passing the threaded pin of the screw 100 through the hole 306, from the bottom side of the electronic board 302. The flange of the screw 100 abuts the bottom surface of the electronic board 302. The hex-nut 200 is then fastened on the threaded pin of the screw 100 protruding out from the hole 306, to secure the screw 100 on the electronic board 302. After securing the screw 100, the electronic board 302 is slid onto the chassis 304 in a direction shown by arrow 308, such that the screw head of the screw 100 fits into a hook 310 on the chassis 304. After sliding the electronic board 302 and fitting the screw heads of the screws into the hooks on the chassis 304, the electronic board 302 is locked on the chassis using a thumbscrew or a plunger (not shown).

With reference to the description above, the electronic board 302 can be assembled on the chassis 304 only by hands, without using any tools. The flange of the screw 100 helps in maintaining a gap between the electronic board 302 and the chassis 304 and thus eliminates the use of standoffs. The flange of the hex-nut 200 helps in gripping and fastening on the hex-nut 200 with ease.

Although implementations for screws, hex-nuts, and coupling units have been described in language specific to structural features, it is to be understood that the present subject matter is not limited to the specific features described. Rather, the specific features are disclosed and explained as example implementations for screws, hex-nuts, and coupling units.

We claim:

1. A coupling unit for tool-less assembling of an electronic board on a chassis, the coupling unit comprising:
   a screw including:
      a threaded pin at one end of the screw;
      a screw head at another end of the screw;
      a flange integral to the screw and positioned between the threaded pin and the screw head; the flange being extended radially to support the electronic board and being positioned at a distance from the screw head based on a gap to be maintained between the electronic board and the chassis;
   a corresponding hook installed on the chassis to receive the screw head; and
   a hex-nut couplable to the threaded pin of the screw for securing the screw on the electronic board,
   wherein the flange of the screw is separated from the threaded pin by a first cylindrical portion of the screw, and wherein the flange of the screw is separated from the screw head by a second cylindrical portion of the screw and wherein the first cylindrical portion has a diameter that is adapted to be substantially equal to an inner diameter of a hole in the electronic board through which the screw is pass.

2. The coupling unit as claimed in claim 1, wherein the threaded pin has an external diameter less than the diameter of the first cylindrical portion.

3. The coupling unit as claimed in claim 1, wherein the second cylindrical portion has a diameter less than the diameter of the first cylindrical portion.

4. The coupling unit as claimed in claim 1, wherein the distance of the flange of the screw from the screw head is about 1.55 mm.

5. The coupling unit as claimed in claim 1, wherein the flange of the screw has a diameter of about 8 mm.

6. A coupling unit for tool-less assembling of an electronic board on a chassis, the coupling unit comprising:
   a screw including:
      a threaded pin at one end of the screw;
      a screw head at another end of the screw;
      a flange integral to the screw and positioned between the threaded pin and the screw head, the flange being extended radially to support the electronic board and being positioned at a distance from the screw head based on a gap to be maintained between the electronic board and the chassis;
   a corresponding hook installed on the chassis to receive the screw head; and
   a hex-nut couplable to the threaded pin of the screw for securing the screw on the electronic board, wherein the hex-nut comprises a flange integral at one end of the hex-nut and wherein the flange of the hex-nut is ribbed.

7. The coupling unit as claimed in claim 6, wherein the flange of the hex-nut has a diameter of about 7.9 mm.

8. A screw for tool-less assembling of an electronic board on a chassis, the screw comprising:
   a threaded pin to secure the screw on the electronic board using a nut;
   a screw head to fit into a corresponding hook on the chassis when the electronic board is assembled on the chassis;
   a corresponding hook installed on the chassis to receive the screw head; and
   a flange integral to the screw and positioned between the threaded pin and the screw head, wherein the flange is extended radially to support the electronic board and is positioned at a distance from the screw head, based on the gap between the electronic board and the chassis;
   a first cylindrical portion between the flange of the screw and the threaded pin; and
   a second cylindrical portion between the flange of the screw and the screw head,
   wherein the first cylindrical portion has a diameter that is adapted to be substantially equal to an inner diameter of a hole in the electronic board through which the screw is passed.

9. The screw as claimed in claim 8, wherein the threaded pin has a length of about 6 mm, and wherein the distance of the flange of the screw from the screw head is about 1.55 mm.

10. The screw as claimed in claim 8, wherein the flange of the screw has a diameter of about 8 mm.

* * * * *